Dec. 20, 1949     E. C. HAUSER     2,491,976
DETACHABLE WHEEL
Filed Jan. 17, 1946
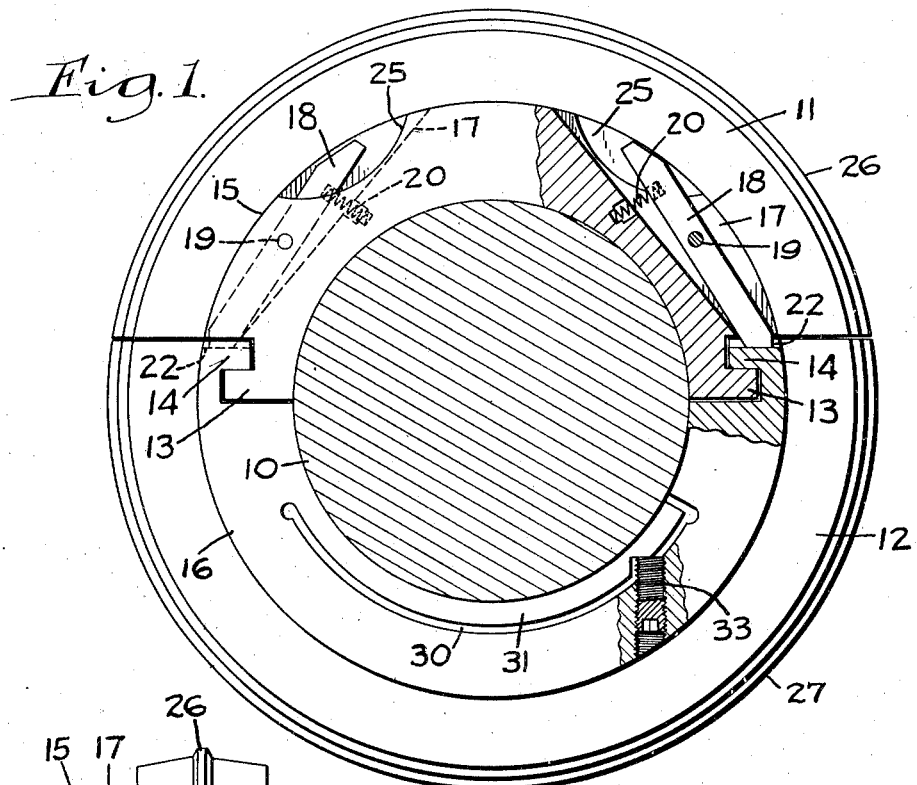
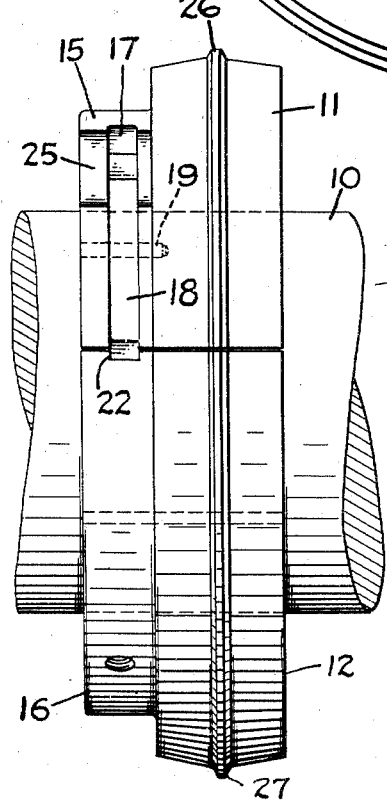
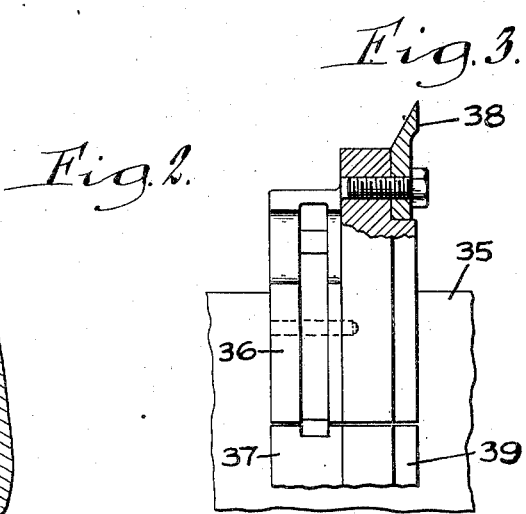
Inventor
Edward C. Hauser
by
Bean, Brooks, Buckley & Bean
Attorneys Patented Dec. 20, 1949

2,491,976

UNITED STATES PATENT OFFICE 2,491,976

DETACHABLE WHEEL

Edward C. Hauser, Bradford, Pa.

Application January 17, 1946, Serial No. 641,825

1 Claim. (Cl. 287—52)

This invention relates to creasing, scoring, slitting, and other wheels and particularly to wheel arrangements affording means for ready attachment to and detachment from supporting shafts.

An example of the field of use of the present invention is found in the corrugated or other paper fabricating industry wherein frequent need for changing scoring, creasing and other wheels arises, although the principles of the invention may be employed wherever the advantages pertaining thereto are of benefit. In the art referred to above the present practice is to employ split creasing wheels which are held together by cap screws. The element of time required in changing wheels of the cap screw type frequently causes operators to use wheels not best suited to particular operations or paper boards of particular kinds or calipers, rather than change to the proper wheel.

The facility with which split wheels may be applied, properly aligned and properly located when pursuing the present invention encourages use of the types of wheels best suited to various operations and conditions. Further, the arrangement is such that final securement of a wheel to the shaft is accomplished by the mere quarter turn of a set screw and, when gripped, the wheel will not slip or wobble and its operating periphery will be uniformly concentric with the supporting shaft.

Other objects and advantages attendant upon use of the principles of the present invention will occur to those skilled in the various arts wherein the novel arrangements of the invention may be employed. It is to be understood that various mechanical changes may be made without departing from the spirit of the present invention, which is not limited otherwise than as defined in the appended claim.

In the drawings:

Fig. 1 is a cross-sectional view through a supporting shaft with one form of the wheel of my invention mounted thereon, portions of the wheel being broken away for clearness;

Fig. 2 is an elevational view of the wheel and shaft of Fig. 1; and

Fig. 3 is a fragmentary elevational view similar to Fig. 2 but showing a wheel having a different working periphery or contour, portions thereof being shown in cross-section.

Throughout the several figures of the drawing like characters of reference denote like parts. In Figs. 1 and 2 the numeral 10 designates a supporting shaft which receives a pair of split scoring wheel halves 11 and 12. The adjacent faces of the wheel halves 11 and 12 have complementary tongue and groove formations 13 and 14, respectively, which may be interfitted by sliding one of the halves along shaft 10 into registry with the other half. The wheel halves 11 and 12 also have laterally projecting hub portions, 15 and 16, respectively.

The hub portion 15 of wheel half 11 is provided with aligned milled slots 17, each of which receives a lever 18 which is medially pivoted to the walls of the slots as by means of pins 19. Compression coil springs 20 act between the upper ends of levers 18, as viewed in Fig. 1, and the bottoms of slots 17 to urge the lower ends of the levers 18 toward shaft 10. This urges the lower ends of levers 18 into engagement with keyways 22 formed in the adjacent faces of the other wheel half 12.

Adjacent the upper ends of the levers 18, as viewed in Fig. 1, hub portion 15 of wheel half 11 is provided with a pair of enlarged recesses 25 which permit an operator to readily depress the upper ends of both levers 18 simultaneously with one hand whereby the lower ends of levers 18 may be held in a withdrawn position to permit ready assembly of the halves 11 and 12 by relative axial movement. After the halves have been partly assembled by such axial movement, the levers 18 may be released so that upon arriving at keyways 22 the ends of levers 18 will automatically drop thereinto and secure the two halves against relative axial movement. The levers 18 may fit moderately closely within the walls of slots 17 and within the side walls of keyways 22, so that accurate alignment of the halves of the wheel is assured. As seen best in Fig. 2, each scoring wheel half is provided with a peripheral scoring ridge 26 and 27, respectively, and these ridges are automatically aligned, in the manner just described, to provide an accurate scoring ridge.

After the halves 11 and 12 are thus located against movement relative to each other, they may still be moved freely on shaft 10 as a unit to their desired location on shaft 10. Wheel half 12 is arcuately slotted as at 30 to provide an inner resilient cantilever projection 31. A set screw 33 threaded into the hub 16 of wheel half 12 bears against the cantilever projection 31 and after the wheel has been located in its desired axial position screw 33 is given a partial rotation which is sufficient to cause cantilever projection 31 to securely clamp the assembled wheel halves in desired position along shaft 10 and in accurate concentricity therewith.

Fig. 3 shows a shaft 35 having wheel halves 36 and 37 which correspond in every way to the wheel halves just described excepting that their working faces are provided with removable slotting or slitting knife portions 38 and 39, respectively.

What is claimed is:

A wheel quickly attachable to a supporting shaft and comprising a pair of complementary semi-circular elements, one of said elements having peripheral slots at opposite sides thereof, a lever pivoted for movement in each of said slots about axes parallel to the supporting shaft axis, said other element having a pair of peripheral slots aligned with said first mentioned slots whereby portions of said levers may extend therein and accurately register said elements relative to each other, and spring means biasing said levers to engagement with the slots of said other element, each of said levers having a portion manually depressible against the action of said spring means to move said lever portions outwardly of the slots of said other elements.

EDWARD C. HAUSER.

REFERENCES CITED

The following references are of record in the file of this patent:

UNITED STATES PATENTS

| Number | Name | Date |
|---|---|---|
| 52,162 | Gray | Jan. 23, 1886 |
| 428,058 | Richards, Jr. | May 13, 1890 |
| 728,692 | Fales | May 19, 1903 |
| 774,965 | Davenport | Nov. 15, 1904 |
| 775,433 | Werle | Nov. 22, 1904 |
| 859,093 | Masters | July 2, 1907 |
| 1,448,277 | Lenz | Mar. 13, 1923 |
| 2,205,195 | Hammon et al. | June 18, 1940 |
| 2,345,008 | Schmidt | Mar. 28, 1944 |
| 2,391,302 | Evans | Dec. 18, 1945 |